United States Patent [19]
Edamura et al.

[11] 3,907,993
[45] Sept. 23, 1975

[54] METHOD FOR SYSTEMICALLY CONTROLLING PLANT DISEASE EMPLOYING CERTAIN PYRIDAZINES

[75] Inventors: Fred Y. Edamura, Concord; Ronald J. Sbragia, Clayton, both of Calif.

[73] Assignee: The Dow Chemical Company, Midland, Mich.

[22] Filed: Mar. 14, 1974

[21] Appl. No.: 451,664

[52] U.S. Cl................... 424/250; 424/DIG. 8
[51] Int. Cl.$^2$............................. A01N 9/22
[58] Field of Search................ 424/250, DIG. 8

[56] References Cited
UNITED STATES PATENTS
3,764,681  10/1973  Dreikorn.................... 424/226

OTHER PUBLICATIONS

Chemical Abstracts, Vol. 67, (1967), p. 21884q.

*Primary Examiner*—V. D. Turner
*Attorney, Agent, or Firm*—S. Preston Jones

[57] ABSTRACT

Methods for systemically protecting plants from soil-borne plant diseases by the application of 6-(1-piperidinyl)tetrazolo(1,5-b)pyridazine, 6-(4-methyl-1-piperidinyl)tetrazolo(1,5-b)pyridazine or 6-(2-methyl-1-piperidinyl)tetrazolo(1,5-b)pyridazine.

10 Claims, No Drawings

METHOD FOR SYSTEMICALLY CONTROLLING PLANT DISEASE EMPLOYING CERTAIN PYRIDAZINES

BACKGROUND OF THE INVENTION

This invention relates to the systemic prevention and control of fungal organisms which attack plant life forms.

The preparation of 6-(1-piperidinyl)tetrazolo-(1,5-b)pyridazine is described in *Isu. Akad. Nauk SSSR, Ser. Khim*, 1967(1), 66; *Chem. Abstra.* 67:21884q. The 2-methyl- and 4-methyl-1-piperidinyl substituted derivatives are prepared utilizing similar procedures with 2-methyl- and 4-methyl-piperidine, respectively. The systemic plant protectant activity of such compounds has not been reported. Moreover, such activity is unexpected and surprising since such compounds have little or no direct contact, i.e., in vitro, activity against soil-borne plant disease organisms. The present invention therefore provides new methods for systemically controlling soil-borne disease organisms which are already established in plant life forms and for preventing or ameliorating the pre- or post-emergence infection of seeds and seedlings in nurseries, greenhouses and farms.

SUMMARY OF THE INVENTION

The present invention is directed to methods for systemically protecting plants from attack by soil-borne plant disease organisms which principally attack the underground portions of plants, said methods, comprising contacting plant life forms or their environment with an effective amount of a plant protectant selected from the group consisting of 6-(1-piperidinyl)tetrazolo-(1,5-b)pyridazine, 6-(4-methyl-1-piperidinyl)tetrazolo-(1,5-b)pyridazine and 6-(2-methyl-1-piperidinyl)tetrazolo(1,5-b)pyridazine (collectively referred to hereinafter as "active ingredients") to thereby permit systemic assimilation thereof by plant life forms.

In the present specification and claims, the term "plant" or "plant life form" is employed to designate all parts of a plant and includes seeds, seedlings, tuber, cutting, the root system, hereinafter commonly referred to as root, the crown, stalk, stem, foliage or leaf system, fruit or flower. As used herein, the terms "systemic" or "plant protectant" activity by an active ingredient refers to the assimilation and translocation of the chemical from the site of application into and through the vascular system of the plant whence it is distributed through the plant tissues, particularly in the underground portions of plants. Obviously, this is a complex process which is unpredictable, and is encountered much more infrequently than superficial or contact activity. Thus, if the active ingredient is applied to seeds, accumulation of the active compound is principally found in the underground system of the germinating seed; if applied to the above ground portions of the plant life form or to the environment thereof, e.g., soil, the active ingredient generally translocates and principally accumulates in the underground portion of the plant.

Representative soil-borne plant disease organisms which are known to attack the below ground portion of plants include Verticillium, Rhizoctonia, Phtophthora, Pythium and Thielaviopsis. Of these, water mold disease organisms such as Pythium and Phytophthora are believed to be the principal disease problems for desirable plants; the active ingredients employed herein are particularly effective against Phytophthora. The present invention thus is useful in providing for the control of the various soil-borne diseases which are known to attack a variety of plants, such as, for example, cereal crops, such as, corn, wheat, barley, rice and sorghum; truck crops, such as, cucurbits (melons, cucumbers, squash, etc.) crucifiers (cabbage, broccoli, etc.), tomatoes and peppers; legumes, such as, peanuts, soybeans, beans, peas, and alfalfa; other crops, such as, tobacco, potatoes, cotton, sugar beets and pineapple; perennial crops, particularly in the seedling stage, such as, citrus (orange, lemon, grapefruit, etc.), apples, pears, peaches, cherries, nut crops (walnuts, pecans, almonds, etc.), grapes, avocado; non-food grass species commonly referred to as turf and nursery and ornamental crops, such as, chrysanthemums, azaleas, rhododendrons, violets, carnations, lilies and shade and foliage ornamentals, such as, philodendrons, Schefflera and Dieffenbachia and the like and gymnospers such as pine, Arborvitae, spruce, junipers and the like.

Plant-protecting amounts of an active ingredient is conveniently applied to plants and/or plant environment, e.g., soil, either before or after the plant has been attacked by soil-borned plant disease organisms, by procedures such as soil injection, drenching with an aqueous composition, seed treatment, topical spraying, furrow spraying or other techniques known to those skilled in the art. The only limitation upon the mode of application employed, is that it must be one which will place the toxicant in direct contact with seeds or plant parts.

The exact dosage of the active ingredient employed will vary depending upon the specific plant, hardiness of the plant, nature of the soil and mode of application. Generally, for practical applications on a commercial scale, the active ingredient can be broadly applied at application rates of from about 0.1 to about 5.0 pounds or more on a per acre basis. Amounts of various diluted solutions containing the active ingredient in terms of parts per million (ppm) necessary to achieve a desired application rate can readily be determined by those skilled in the art given the active ingredient concentration. For example, the application of 200 gallons of a solution containing 600 ppm active ingredient is generally equivalent to the application of about 1 pound of active ingredient per acre. A preferred range is from about ¼ to about 3.0 or more pounds per acre. Commerically, seed treatments are customarily recommended on the basis of ounces per hundredweight per bushel. This can be expressed in ppm as from about 5.0 to about 1000 ppm or more. Thhe upper limit in any of the foregoing application rates is, of course, determined by phytotoxic manifestations encountered by the treatment, which will depend upon the compound employed and the various factors set forth above. Of course, lesser or greater rate can be utilized depending upon the particular situation.

Larger amounts of the active ingredient advantageously may be applied when treatments are employed which distribute the material throughout the soil. For example, when the active ingredient is applied as an at-plant row treatment or as an early season post-plant side-dress treatment, those amounts of chemical not proximal to plant roots are essentially unavailable to the plant and therefore not effective as set forth herein-above. In such practices, amounts of the active ingredient need to be increased to rates as high as about 10 pounds or more per acre to assure the requisite effective quantity of active ingredient is made available to the plants.

The present invention can be carried out by employing the active ingredients directly, either singly or in combination. However, the present invention also embraces the employment of liquids, dusts, wettable powders, granules or encapsulated compositions containing at least one of said compounds as active ingredient. In such usage, the compound or compounds can be modified with one or more of a plurality of inert solid or liquid carrier adjuvants including inert solvents, inert liquid carriers and/or surface active dispersing agents and coarsely or finely divided inert solids. The augmented compositions are also adapted to be employed as concentrates and subsequently diluted with additional inert carrier to produce other compositions in the form of dusts, sprays, granules, washes or drenches. In compositions where the adjuvant is a coarsely or finely divided solid, a surface active agent or the combination of a surface active agent and a liquid additament, the adjuvant cooperates with the active component so as to facilitate the invention. Whether the composition is employed in liquid, wettable powder, dust, granule or encapsulated form, the active compound will normally be present in an amount of from about 2 to 98 percent by weight of the total composition.

In the preparation of dust, or wettable powder compositions, the active ingredient can be compounded with any of the finely divided solids, such as pyrophyllite, talc, chalk, gypsum, fuler's earth, bentonite, attapulgite, starch, casein, gluten and the like. In such operations, the finely divided carrier is ground or mixed with the toxicant or wet with a solution of the active ingredient in a volatile organic solvent. Also, such compositions when employed as concentrates can be dispersed in water, with or without the aid of dispersing agents to form spray mixtures.

Granular formulations are usually prepared by impregnating a solution of the active ingredient in a volatile organic solvent onto a bed of coarsely divided attapulgite, bentonite, diatomite, or the like.

Similarly, the active ingredient can be compounded with a suitable water-immiscible inert organic liquid and a surface active dispersing agent to produce an emulsifiable concentrate which can be further diluted with water and oil to form spary mixtures in the form of oil-in-water emulsions. In such compositions, the carrier comprises an aqueous emulsion, i.e., a mixture of inert water-immiscibile silvent, emulsifying agent and water. Preferred dispersing agents which can be enployed in these compositions, are oil-soluble materials including non-ionic emulsifiers such as the condensation products of alkylene oxides with the inorganic acids, polyoxyethylene derivatives or sorbitan esters, complex ether alcohols and the like. Also, oil-soluble ionic emulsifying agents such as mahogany soaps can be used. Suitable inert organic liquids which can be employed in the compositions include petroleum oils and distillates, toluene, liquid halohydrocarbons and synthetic organic oils. The surface-active dispersing agents are usually employed in liquid compositions and in the amount of from 0.1 to 20 percent by weight of the combined weight of the dispersing agent and the active ingredient.

In addition, other liquid compositions containing the desired amount of active ingredient can be prepared by dissolving the same in an inert organic liquid such as acetone, methylene chloride, chlorobenzene and petroleum distillates. The preferred inert organic solvent carriers are those which are adapted to accomplish the penetration and impregnation of the environment and particularly soil with the toxicant compounds and are of such volatility as to leave little permanent residue thereon. Particularly desirable carriers are the petroleum distillates boiling almost entirely under 400°F. at atmospheric pressure and having a flash point above 80°C. The proportion of the compounds of this invention employed in a suitable solvent may vary from about 2 to about 50 percent or higher.

A preferred liquid compositions includes the use of the active ingredient or ingredients in combination with surface active dispersant agents only. In such compositions, it is preferred to use ionic and non-ionic blends of such dispersant agents in combination with one or more of the active materials. A particular advantage of such a formulation is that phytotoxicity associated with certain inert solvents, such as, xylene, methylene chloride, and like materials can be avoided. Generally, the use of such formulations will result in compositions containing 75 percent or more of the active component.

Owing to the excellent suspendibility of the above formulation in water, it is convenient and often preferred to prepare and use aqueous concentrates as stock solutions themselves. In such practices, minor agitation results in a practical, stable formulation very adaptable for use in its concentrate form to treat soil in sprays or drenches. Additionally, if desired, the concentrates can be easily diluted with additional water for use as foliar spray treatments, soil drench treatments and the like.

Water miscible organic solvents such as lower alcohols or propylene glycol can be added to depress the freezing point and further cooperate with the above system in that they are essentially non-phytotoxic.

DESCRIPTION OF THE PREFERRED EMBODIMENTS

In order that the present invention may be more fully understood, the following examples are provided to illustrate the manner by which it can be practiced but, as such should not be construed as limitations upon the overall scope of the same.

EXAMPLE 1

A 10,000 ppm concentrate solution of each of the 6-(1-piperidinyl)tetrazolo(1,5-b)pyridazine (A), 6-(4-methyl-1-piperidinyl)tetrazolo(1,5-b)pyridazine (B), and 6-(2-methyl-1-piperidinyl)tetrazolo(1,5-b)pyridazine (C) test compounds was prepared and a 0.25 ml aliquot of each was added to 100 ml of water to give treating solutions containing 25 ppm of active ingredient. Soil infested with the tobacco black shank pathogen *Phytophthora parasitica* var. nicotianae was placed in a predetermined number of 2-inch pots and small, 3 to 4 week old tobacco seedlings, which had been grown in a disease-free medium were transplanted in said pots. Immediately thereafter, sets of pots were drenched with about 40 ml of one of the prepared treating solutions. The treated pots, along with untreated controls, were then maintained under greenhouse conditions conducive to growth and watered daily. The treated plants were evaluated for disease control when the treated checks had died. For such operation, each of test compounds (A) and (B), evaluated when the control plants died 4 days following treatment, were found to give 100 percent control of the disease organism while test compound (C), evaluated when the controls died after 5 days, was similarly found to give 100 percent control of the disease organism.

EXAMPLE 2

The procedures of Example 1 were duplicated employing test compound (B) and treating solutions containing said test at concentration of 25 and 6.2 ppm, respectively. The treated plants were first evaluated when the untreated checks died after a period of 5 days and evaluated again 7 days later. In such operations, test compound (B) was found to give 100 percent control of the tobacco black shank disease organisms at each test concentration and at each evaluation.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A method for systematically controlling diseases of plant-life forms caused by soil-borne plant disease organisms selected from the group consisting of Verticillium, Rhizoctonia, Phytophthora, Pythium and Thielaviopsis which comprises applying an effective amount of from 0.1 to about 10 pounds per acre of a plant protectant selected from the group consisting of 6-(1-piperidinyl)tetrazolo(1,5-b)pyridazine, 6-(4-methyl-1-piperidinyl)tetrazolo(1,5-b)pyridazine and 6-(2-methyl-1-piperidinyl)tetrazolo(1,5-b)pyridazine to plant life forms or their environment to thereby permit assimilation thereof by said plant life form to systemically control the plant disease.

2. The method as defined in claim 1 wherein tha plant life forms are contacted with said plant protectant prior to being attacked by plant disease organisms.

3. The method as defined in claim 1 wherein the plant life forms are contacted with said plant protectant after being attacked by plant disease organisms.

4. The method as defined in claim 1 wherein the plant protectant is applied to plant life environment.

5. The method as defined in claim 1 wherein plant seeds are contacted with said plant protectant.

6. The method as defined in claim 1 wherein said plant protectant is employed in combination with an inert carrier.

7. The method of claim 1 wherein the plant protectant is 6-(1-piperidinyl)tetrazolo(1,5-b)pyridazine.

8. The method of claim 1 wherein the plant protectant is 6-(4-methyl-1-piperidinyl)tetrazolo(1,5-b)-pyridazine.

9. The method of claim 1 wherein the plant protectant is 6-(2-methyl-1-piperidinyl)tetrazolo(1,5-b)-pyridazine.

10. The method of claim 1 wherein said plant protectant is employed at a rate of from about 0.1 to about 5.0 pounds per acre.

* * * * *